March 31, 1936. F. A. WALKER 2,035,625
DISHWASHING APPARATUS
Filed July 6, 1932
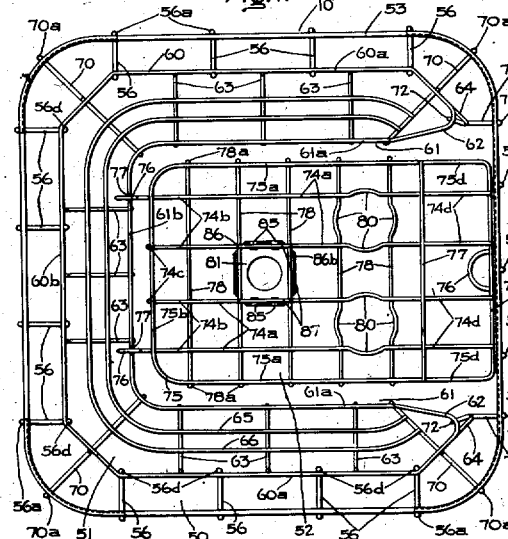
Inventor:
Forrest A. Walker,
by Charles E. Mullen
His Attorney.

Patented Mar. 31, 1936

2,035,625

UNITED STATES PATENT OFFICE 2,035,625

DISHWASHING APPARATUS

Forrest A. Walker, Chicago, Ill., assignor to Walker Dishwasher Corporation, a corporation of New York Application July 6, 1932, Serial No. 621,042

13 Claims. (Cl. 141—9)

My invention relates to dishwashing apparatus and has for its object the provision of improved means for receiving and supporting dishes and like utensils in the vat or washing chamber of the apparatus.

Although not limited thereto, my invention has particular application to dishwashing apparatus wherein a suitable cleansing fluid, such as hot water, is circulated or hurled upwardly and outwardly with a more or less whirling motion through a washing chamber or vat by suitable power driven means, such as a motor driven impeller.

In dishwashing apparatus of the above character, the dishes and like utensils being cleansed are supported by means of open-work baskets or trays so as to be subjected to the washing action of the cleansing fluid as it is circulated through the vat by the impeller. Usually two of these racks are provided, one arranged to be supported in the lower portion of the vat and the other arranged to be supported above the lower rack in the upper portion of the vat.

My invention contemplates the provision of improved racks of this character which are capable of receiving and supporting a variety and relatively large number of dishes and like utensils, and further, arranged so that the utensils can be easily and quickly loaded and unloaded.
My invention further contemplates the provision of improved means for supporting the utensils in such positions in the vat that a more efficient cleansing action is effected.

In carrying out my invention, I provide a lower rack with a plurality of open-work utensil receiving compartments. One of these compartments, preferably an inner compartment, is sub-divided into a plurality of separated chambers arranged to receive plates, platters and like utensils in compact but spaced relation and to support them in such positions that the cleansing fluid as it is hurled through the vat will be caused to impact against the faces of the utensils. Another compartment, preferably an outer compartment surrounding the inner compartment, is arranged to receive a relatively large number of bowls, vegetable dishes and like objects, and to support them in such positions that they also will be subjected to the impact of the cleansing fluid as it is circulated through the vat.

The upper rack likewise is provided with a plurality of compartments. One of these compartments is relatively deep and is arranged to receive small plates, saucers and like utensils, while another compartment is arranged to receive cups, water glasses, small bowls and the like. This latter compartment is provided with a bottom inclined to the vertical so that the utensils may be supported with their inner surfaces exposed to the cleansing action of the water and at the same time provide for proper drainage of the inverted bottoms. These compartments preferably are given a substantially U-shape and one is arranged to be embraced by the other.

Embraced by the inner of the two compartments is a third compartment arranged to receive comparatively deep utensils, such as tall water goblets, deep bowls, bottles, cups, etc. This latter compartment is arranged to be moved relatively to the rack. This is an important feature of my invention in that the movable compartment provides means whereby the attendant can gain access to the lower rack without removing the upper rack from the vat. By reason of this arrangement the attendant can load and unload each of the racks while they are positioned within the vat.

For a more complete understanding of my invention reference should be had to the accompanying drawing in which Fig. 1 is a plan view of a dish-supporting rack intended to be used in the upper portion of a washing vat and arranged in accordance with my invention; Fig. 2 is a plan view of a dish-supporting rack intended to be used in the lower portion of a washing vat and arranged in accordance with my invention; Fig. 3 is a screen member arranged to be used with the lower rack of Fig. 2; Fig. 4 is a vertical elevation of dishwashing apparatus with parts broken away and in section showing the upper and lower racks of Figs. 1 and 2 in their operative positions within of the vat; Fig. 5 is a view illustrating a portion of the lower rack shown in front and side elevation; and Fig. 6 is a fragmentary view illustrating a detail of construction of the upper rack shown in Fig. 1.

Referring to the drawing, I have shown my invention in one form as applied to upper and lower open-work dishwashing trays 10 and 11 intended to be used with dishwashing apparatus provided with a washing vat of substantially square cross-section, such as disclosed in the copending applications of Snyder and Clark, Serial No. 587,014, filed January 16, 1932, and Serial No. 608,248, filed April Snyder and Clark, 29, 1932, both of which applications have matured into patents numbered 1,995,331 and 1,995,332, respectively, and are assigned to the same assignee as this invention.

The trays 10 and 11, as shown, are applied to dishwashing apparatus comprising a washing vat 12 which is supported in a vertical position by and within a suitable casing 13. The casing 13 is supported in an elevated position on legs 14. The vat 12 is substantially square in cross-section and so is its casing 13.

The bottom wall of the vat 12 is provided with a plurality (four) of inclined portions 15 which slope downwardly toward the center of the vat. In the bottom of the vat and surrounded by the walls 15 is an impeller 16 arranged when rotated to hurl a cleansing fluid, such as hot water, upwardly and outwardly through the vat with a more or less whirling motion. This impeller 16 is driven by a suitable electric motor 17 supported beneath the bottom wall of the vat and connected with the impeller by means of a suitable shaft (not shown). Also arranged within the lower portion of the vat is a suitable spray device 18 which, as shown, is provided with the reaction nozzles 18a arranged so that when water is supplied to the spray device it will be hurled upwardly and outwardly in streams through the vat. Cleansing fluid is supplied to the spray device by means of conduits 19 which communicate with a suitable source of water supply (not shown). This spray device is described and claimed in a copending application of Jesse H. Clark, Serial No. 653,243, filed January 24, 1933, which has matured into Patent No. 2,025,571 and is assigned to the same assignee as this invention.

The vat is closed by a suitable cover 12a.

The lower rack 11, as shown (Figs. 2 and 4), is rectangular in plan to correspond approximately to the interior dimensions of the vat 12 so that it may readily be inserted in and withdrawn from the vat. As shown, the rack comprises an inner compartment 20 and an outer compartment 21 formed by a plurality of suitably spaced wire members suitably secured together. The rack, as shown, is formed by a ring-shaped wire member 22 and a pair of closed wires 23 and 24 having a substantially square shape spaced vertically from the ring member 22 and from each other. The vertical space between the members 23 and 24 is somewhat greater than is the space between the member 22 and the member 23. As shown, corresponding sides of the square members 23 and 24 lie in common vertical planes which intersect the plane passed through the ring member 22.

The wire members 23 and 24 form squares somewhat larger than the ring member 22. These members are secured together and to the ring 22 by means of a plurality of wires including four wires 25 spaced at intervals 90° apart about the ring 22. Each member 25 has one end connected to the ring 22. From this connected end the member 25 extends in the plane of the ring member to the vertical plane of the associated wires 23 and 24 in which plane it extends upwardly tangentially to the outer surfaces of these wires having its other end secured to the top wire 24, the ends of the wires 25 are secured to the wires 22 and 24 in any suitable manner, as by spot welding. The wires 25 may be and preferably are secured to the intermediate wire 23 in a similar manner.

The wire members 22, 23 and 24 are further secured together by means of suitable wire members 26. As shown, there are four of these wires positioned at the four corners of the rack. Each wire 26 has one end secured to the ring 22 so as to be normal thereto. From the joint with the ring the wires extend outwardly in the plane of the ring 22 and to the vertical planes of the wires 23 and 24 in which planes they extend upwardly tangentially to these wires. The wires 26 are secured at the points of engagement with the wires 22, 23 and 24 in any suitable manner, as by spot welding.

Secured to the wires 23 and 24 are a plurality of handles 28. As shown, there are four of these members, one being located at each corner of the rack. Each handle as shown comprises a U-shaped portion astride the associated corner of the rack and comprising legs 28a arranged in vertical planes tangentially to the wires 23 and 24, to which they are secured in any suitable manner, as by spot welding. These legs, as shown, extend somewhat above the plane passed through the wire 24, and each associated pair are joined at their upper ends by substantially horizontal portions 28b completing the U.

The handle members 28 also serve to support a ring member 30 having a diameter somewhat larger than the diameter of the ring 22 and arranged substantially concentrically with it. The ring 30, as shown, is supported in a plane parallel to the ring 22 and elevated with respect to it by means of the members 28 which are provided with horizontal portions 28c (Figs. 2 and 4) arranged substantially in the plane of the ring 22. The ends of these portions, as clearly shown in Fig. 4, are upturned and to the ends of these upturned portions the ring 30 is secured and supported. The ring may be secured to these upturned portions in any suitable manner, as by spot welding.

The handles 28 are strengthened by means of braces 31. As shown, there are two of these braces provided for each handle, each brace being provided with a portion 31a (Fig. 4) secured at its upper end to one of the upright legs 28a, and inclined to the leg to which it is attached. The inclined portion terminates in a vertical portion 31b (Fig. 4) which is arranged tangentially to the wires 23 and 24, the wires being secured together at the points of tangency in any suitable manner, as by spot welding. The vertical portion 31b terminates in a horizontal portion 31c lying substantially in the plane of the ring member 22 and terminating at the ring member to which member it is secured in any suitable manner, as by spot welding.

Arranged substantially concentrically of the ring 22 and in a plane somewhat elevated with respect to that of this ring is a ring member 32 of smaller diameter. The ring 32 is secured to the ring 22 and supported by means of a plurality of brackets 33. These brackets are spaced circumferentially at substantially uniform intervals and together with the rings 22 and 32 define the compartment 20. This compartment, as shown (Fig. 2), is sub-divided by the brackets 33 into a plurality of compartments or chambers 34 (Fig. 2).

Each bracket 33 in front vertical elevation has an inverted elongated distorted U-shape, as shown in Fig. 5. Similarly in plan, the brackets have a distorted U-shape as shown in Fig. 2. In this case, however, the U is foreshortened.

The bottom portions 33a of the vertical legs of each bracket are secured to the inner and outer rings 32 and 22 in any suitable manner, as by spot welding. These portions incline at an angle to the vertical in the counter-clockwise direction as shown in Figs. 2 and 5. The outer leg 33a terminates in a substantially straight portion 33b arranged at an angle to the portion 33a, as shown in Figs. 2, 4 and 5 and which terminates in the bend 33c of the vertical U at a point somewhat in advance of the legs 33a in the counter-clockwise direction. The bend 33c is connected with the inner leg 33a by means of two substantially straight leg portions 33d and 33e. The portion 33d adjacent the bend is formed at an acute angle with the portion 33b of the outer leg, while the portion 33e joining the portion 33d to the portion 33a is arranged at a somewhat greater angle with the portion 33b, as clearly shown in Figs. 2 and 5.

The points of attachment of the inner members 33a with the ring 32 and of the outer members 33a with the ring 22 of successive brackets are spaced in radial lines substantially 15° apart, while the point of attachment between the inner leg 33a of each bracket with the inner ring 32 lies in a radial line approximately 15°-17° in advance of the radial line passed through the point of attachment of the corresponding outer leg 33a with the ring 22. These members, as shown (Fig. 2) are so arranged that the leg portions 33a lie in lines substantially tangentially to the inner ring 32.

It will be observed by reason of the foregoing construction that the brackets 33 slope away from their points of attachment to the rings 22 and 32 in a counter-clockwise direction, and further, are so arranged that they define compartments having elevation and plan sections approximating the cross section of a comparatively large shallow circulate plate. Further, it will be observed that the brackets support plates and the like with their flat surfaces inclined at an angle to the vertical in a counter-clockwise direction and in planes arranged substantially tangentially to the ring member 32.

The outer wall of the outer compartment 21, as shown, is defined by the horizontal wires 23 and 24, and the vertical portions of the wires 25, 26, 28 and 31; the bottom wall of this compartment is defined by the horizontal portions of these wires and by the elevated ring member 30; and the inner walls are defined by the outer legs of the brackets 33. This compartment 21 can be used conveniently to support dishes such as soup bowls, plates and serving dishes, the dishes being supported on an end or edge and retained by the elevated ring 30.

The entire bottom surface of the tray 11 is covered by means of a screen member 40 formed of wires woven together in mesh form, as clearly shown in Figs. 3 and 4. This screen, as shown, has a substantially square shape to conform to the contour of the tray 11. The screen 40, as shown, is secured to a peripheral binding member 41, preferably formed of rubber. This member 41 is provided with a number of clips 42 which serve to secure the screen to the under surface of the tray 11. These clip members 42 are arranged to grip the wire portions 28c at each corner of the rack and the wire portions 25 substantially mid-way of the length of the sides of the wires 23 and 24.

The central portion 40a of the screen tapers upwardly, as shown in Fig. 4, and terminates in an opening 43 which is bounded by an inner marginal member 44 securing the edges of the screen surrounding the opening. This member 44 preferably will be formed of a suitable resilient material, such as rubber. The aperture 43 is provided to accommodate the spray device 18 whereby the lower rack may be positioned within the vat without interference with the spray device.

The screen 40 functions as a bottom wall for the compartments 20 and 21 of the tray 11.

Supported above the screen 40 in an open-work compartment 44 adapted to be fitted over and about the spray device 18. This compartment is utilized to receive silverware and the like.

It will be observed in view of the foregoing construction that I have provided a lower rack for a dishwashing vat arranged to receive a number of dishes. The inner compartment 20 defined by the brackets 33 is arranged to receive a number of plate-like utensils spaced in compact relationship.

The specific arrangement and shape of the compartments 34 defined by these brackets is an important feature of my invention in that the flat surfaces of the dishes supported in the compartments lie in such positions that the impact of the water hurled upwardly and outwardly by the impeller 16 with a whirling motion will be substantially directed against the faces of the dishes. In other words, the dishes are supported in planes angularly disposed to the vertical leaning in a counter-clockwise direction, and in planes arranged substantially tangentially with the inner circle 32 of the rack located adjacent the axis of the rack and the axis of rotation of the impeller.

The outer compartment 21 is relatively large and functions to receive a relatively large number of utensils, such as large platters, bowls, vegetable dishes, large cups, etc. It will be understood that these bowls are placed in the chamber 21 in an inclined position with their lower edges resting against the ring 30 and their upper edges resting against the side walls of the compartment, and preferably, with their interior surfaces exposed to the action of the water hurled by the impeller 16.

The screen member 40 serves to prevent small articles such as knives, etc. from falling into the lower portion of the vat. The screen further serves to help distribute the water which is hurled upwardly by the impeller over and about the utensils supported within the rack.

The lower rack is supported on the bottom walls 15 in an elevated position by means of legs 48 which are secured in any suitable manner to the screen 40.

The upper rack, as shown (Fig. 1), is rectangular in plan to correspond approximately to the interior dimensions of the vat 12 so that it may be readily inserted in and withdrawn from the vat. As shown, this upper rack comprises an outer compartment 50, a compartment 51 embraced by the outer compartment and a third compartment 52 embraced by the compartment 51.

The rack, as shown, is formed of a plurality of wires including three substantially closed square wires 53, 54 and 55. The planes of these wires, as shown, are spaced apart at substantially equal intervals in parallel relation. These wires are secured together by means of a plurality of wires 56. As shown, each of these wires 56 comprises a vertical portion 56a arranged tangentially to the wires 53, 54 and 55 and secured at the points of engagement in any suitable manner, as by spot welding. These vertical portions 56a at their lower ends terminate in inwardly inclined portions 56b which extend beyond the wire 55 for a distance substantially equal to the distance from the wire 56 to the wire 53 and terminating at their ends in horizontal portions 56c. These, as shown, turn inwardly for a comparatively short distance and then turn upwardly in vertical portions 56d. The wires 56 thus have a distorted U-shape (Fig. 4), the inner legs 56d being somewhat shorter than the outer legs 56a, 56b. It will be observed (Fig. 1) that these members 56 are arranged at spaced intervals around three sides of the wires 53, 54 and 55. The fourth sides of these wires are secured together by means of three vertical wires 57 arranged tangentially to these sides of the wires and secured thereto in any suitable manner, as by spot welding.

Secured to the upper ends of the inner legs 56d of the members 56 in spaced relation with the outer walls defined by the members 53, 54 and 55 is a wire 60. As shown, this wire has a substantially U-shape, the two legs 60a of which and the leg 60b connecting these legs being arranged in parallel relation respectively with the three sides of the wires 53, 54 and 55 that are secured by the brackets 56. The wire 60, as shown, is provided with a reentrant portion 61 which has two legs 61a parallel with the legs 60a, and with a side 61b connecting the legs 61a and arranged in substantially parallel relation with the connection member 60b. As shown, the ends of the legs 60a and 61a are secured by substantially V-shaped members 62. Preferably and as shown, the legs 60, 61 and 62 will be formed as a unitary member.

The wires 60 and 61 define the upper, outer and inner edges of the intermediate chamber 51. The bottom and side walls of this chamber are defined by a plurality of brackets 63 which, as shown (Fig. 4), have a distorted V-shape, the right or inner leg 63a of which is substantially longer than the left or outer leg 63b. The right leg 63a of each bracket 63, as shown, is secured at its upper end to the inner wire 61 from which it projects downwardly and outwardly at an angle of substantially 45°. The leg 63a at its lower end joins with the outer leg 63b which, as shown (Fig. 4), lies in the plane of the legs 56d of the brackets 56. The upper ends of the leg portions 63d are secured to a wire member 64 having a substantially U-shape and lying directly under the wire 60 and spaced vertically from it, as clearly shown in Fig. 4; these ends of the legs 63b may be secured to the wire 64 in any suitable manner, as by spot welding. The wire 64 is arranged tangentially with the vertical legs 56d of the brackets 56 and is secured at the points of engagement in any suitable manner, as by spot welding. It will be observed that the member 64, together with the member 60, the vertical portions 56d of the brackets 56 and the vertical portions 63b of the brackets 63, form the inner wall of the outer chamber 50, and the outer wall of the intermediate chamber 51.

Secured at spaced intervals to the inclined leg portions 63a of the brackets 63 are a pair of U-shaped members 65 and 66. It will be observed (Fig. 1) that these wires 65 and 66 have a substantially U-shape similar to the shape of the wires 60 and 61, and that these members 65 and 66 cooperate with the member 61 to define an inclined inner and bottom wall for the chamber 51.

Each corner of the rack is provided with a supporting member 70; as shown, these members 70 are arranged on radial lines spaced substantially 90° apart. Each supporting member 70 comprises a leg 70a (Fig. 4) arranged tangentially to the three wires 53, 54 and 55 and secured to these members at the points of tangency in any suitable manner, as by spot welding. These vertical portions 70a beyond the wire 55 are directed inwardly somewhat toward the axis of the vat, as clearly shown in Fig. 4. These members, as shown, have a length somewhat greater than the length of the legs 56b of the brackets 56 and, as shown, terminate at their lower ends in substantially horizontal portions 70b which extend for some distance inwardly toward the central axis of the vat. The horizontal portions 70b terminate in vertical portions 70c which extend upwardly substantially to the plane containing the bends of the U-brackets 63 in which plane they are directed inwardly for a relatively short distance toward the axis of the vat. These relatively short horizontal portions terminate in portions 70d which incline upwardly at an angle substantially equal to the angle of inclination of the portions 63a of the brackets 63. These inclined portions 70d, as shown, are tangential to the wires 61, 65 and 66, and are secured to these wires at the points of tangency in any suitable manner, as by spot welding. It will be observed that the wires 65 and 66 terminate in the supporting brackets 70 arranged at the front of the dishwashing basket 11. The horizontal portions 70b, as shown in Fig. 4, are arranged to rest upon the brackets 28 of the lower rack 11 so as to support the upper rack 10 in an elevated position in the upper portion of the vat 12.

Arranged at the front of the rack are a pair of members 71 having shapes substantially identical with the shapes of the brackets 56 (see Fig. 4). Thus, each of these members, as shown (Fig. 4), is provided with a substantially vertical portion 71a arranged tangentially with the three wires 53, 54 and 55, the vertical portion terminating in an inwardly inclined portion 71b which in turn terminates in a horizontal portion 71c that in its turn terminates in a vertical portion 71d extending upwardly substantially parallel with the vertical portion 71a attached to the wires 53, 54 and 55. As shown, these members 71 are positioned adjacent the V-shaped bend portion 62 that connects the members 60 and 61, and, as shown, the vertically upwardly extending portion 71d is connected with the bend portion 62, as indicated at 72. It will be understood that the members 71 will be connected with the wires 53, 54 and 55 and with the wire 62 in any suitable manner, as by spot welding.

The ends of the wire member 64 terminate in the inner vertical portions 71d of the brackets 71 and are secured thereto in any suitable manner, as by spot welding.

It will be observed that the wire members thus far described define a relatively deep chamber or compartment 50 having a substantially U-shape both in elevation and in plan, and a second compartment 51, U-shaped in plan, embraced by the compartment 50. The second compartment 51 is not as deep as the compartment 50 and, as shown, is provided with a bottom wall which is inclined to the vertical at an angle of substantially 45°.

The third compartment 52, as has been pointed out previously, is embraced by the compartment 51. The compartment 52 is formed by a plurality of wire members 74 spaced laterally at substantially equal intervals. There are four of these wires and, as shown more clearly in Fig. 4, each wire comprises a substantially straight horizontal portion 74a terminating at its ends in downwardly inclined portions 74b, each of these members being of substantially equal length. The portions 74b at their ends terminate in vertically upwardly extending portions 74c at the front and rear of the tray. Secured in an elevated position with respect to the plane containing the portions 74a is a wire member 75 which, as shown, has three sides including two sides 75a parallel with each other and with the legs 61a of the member 61, and a third side 75b joining the sides 75a and parallel with the portion 61b of the member 61. The portion 75b is secured to the members 74c at the points of engagement by any suitable means, as by spot welding.

The wire portions 74c of the two outer members 74 at the rear thereof project upwardly somewhat above the plane containing the wire member 75 and are turned inwardly upon themselves to define hinge brackets 76. These brackets 76 are hinged to the portion 61b of the wire member 61, this portion, as shown, being provided with downwardly bent U-shaped portions 77 to receive and secure the hinges, as clearly shown in Fig. 6.

The front portions 74c of the members 74 project upwardly above the plane containing the wire 75. These upwardly projecting portions terminate in portions 74d turned outwardly at right angles to the vertical portions 74c, as shown in Figs. 1 and 4. The front end portions of the two wires 75a of the member 75 are turned upwardly in a vertical direction at right angles to the plane containing the member 75 to define portions 75c that lie in the vertical plane containing the portions 74c of the member 74. The upper ends of these portions 75c terminate in horizontal portion 75d that lie substantially in the plane of the wire portions 74d. The front ends of these portions 75d are connected by means of a transverse portion 75e. The wire portions 74d are secured at their ends to the transverse portion 75e as shown in Fig. 1. This may be accomplished by means of spot welding. It will be observed that the wire portions 74d and 75d define a ledge arranged in a plane parallel with the plane containing the wire 75 and elevated somewhat above this plane. This ledge serves as a means for supporting the front end of the tray 52. The ledge, as shown, cooperates with a stop or abutment 76 which is secured to the front side of the intermediate wire 54 in any suitable manner as by welding.

Preferably the vertical portions 74c and 75c will be braced by means of a transverse wire 77 secured to the wires in any suitable manner, as by spot welding.

The inner compartment 52 is completed by a plurality of transverse wires 78, spaced at intervals longitudinally of the rack and extending across the bottom of the compartment substantially tangentially to the portions 74a of the wire members 74 to which they are secured in any suitable manner, as by spot welding. The ends of the wires 78 are turned upwardly into vertical portions 78a, the upper ends of which are secured to the wire 75 in any suitable manner, as by spot welding.

It will be observed in view of the foregoing description that the inner compartment 52 is hinged at its rear end to the wire 61b and is provided at its front end with a ledge which cooperates with a suitable stop 76 to support the front end of the tray. This arrangement is a very important feature of my invention in that the compartment 52 may be swung as a unit upon the hinges 76 to an open position, whereby access may be had to the lower tray 11 without the necessity of removing the entire upper tray 10. It will be observed that the compartment 52 is relatively large so that when it is open a relatively large opening is provided in the upper tray through which the attendant can conveniently load and unload the lower rack 11. If desired, the compartment 52 may be arranged to be removed as a unit from the upper tray 11.

It will be understood in view of the foregoing construction that the relatively deep compartment 50 may be used to support such flat utensils as saucers and the like in a substantially vertical position, while the intermediate compartment 51 can be utilized to support water glasses, cups, small bowls, and the like at an angle to the vertical and preferably with their inner surfaces directed toward the interior of the vat. The inner compartment 52 may be utilized to support water goblets, deep bowls, cups and like members in an inverted position so as to expose their inner surfaces to the action of the water.

This inner compartment 52 may be further utilized to support bottles having relatively large mouths or openings, such as milk bottles, in an inverted position so as to expose their interior surfaces to the action of the water which is hurled upwardly and outwardly through the vat by the impeller. For this purpose, the wires 74 and certain of the transverse wires 78, as for example the two first wires 78 positioned at the front of the compartment, are provided with bends or curved portions 80 which taken together approximate a circle. It will be understood that the bends 80 are arranged to receive the neck or similar portion of a milk bottle or the like when it is in an inverted position, the body of the bottle resting on the wires 74, 78 defining the bends, whereby the bottle is supported in an inverted position in the vat.

The compartment 52 is further utilized to support a suitable soap or detergent container 81. This container comprises a cylindrical body portion 82 over the mouth or lower end of which is provided a closure member 83. This closure member, as shown, is secured in spaced relation with the lower edge of the member 82 by means of a plurality of straps 84. The member 83, as shown, is provided with a reentrant bottom which extends upwardly into the cylinder. The cylindrical portion 82 and its attached cover 83 are secured to the wires 74 of the tray 52 by means of suitable clamping members 85.

It will be observed that soap or some similar material placed in the container normally will be retained by the bottom wall 83, but that when the impeller 16 is hurling water upwardly through the vat, some of this water will fall into the soap container through the upper open end of the cylindrical portion 82 and wash the soap through the space provided between the bottom edge of this container and its bottom wall 83 into the vat where it will mix with the cleansing fluid which is hurled upwardly and outwardly through the racks 10 and 11 in which the dishes are supported.

However it is impossible for the spray device 16 to function to wash soap from the receptacle into the vat because the bottom cover 83 operates as a baffle to deflect the water issuing from the nozzles 18a from the container. This is an important feature in that while detergent is automatically supplied for the washing operation, it cannot be supplied during the rinsing operations. This is because the water issuing from the spray device 18 is projected upwardly and outwardly in the vat in comparatively small streams or sprays, and, therefore, very little, if any, of the water will find its way into the upper open end of the container 84; the impeller 16, however, in operating to wash the dishes, hurls relatively large quantities of water upwardly through the rack with considerable force so that a material volume of the water is deflected from the cover 12a of the vat into the mouth of the container where it mixes with the soap and washes it out of the opening in the bottom of the container.

Arranged directly above the soap container is a suitable brace 86, which is defined by upraised inverted U-shaped portions formed in the transverse members 78 to extend upwardly between the middle longitudinal wires 74. These upturned portions are defined by vertical sections of wire 86a connected by means of transverse portions 86b. The upper ends of these portions substantially at the points of connection between the vertical wires 86a and the horizontal wires 86b are joined by means of transverse wires 87. This brace functions as a guard to prevent the utensils that go in the compartment 52 from being placed directly over the mouth of the container 81.

Preferably all of the wires forming both the lower and upper trays will be covered with a resilient coating formed of some suitable material, such as rubber.

In using the trays, it will be understood that they may be loaded or unloaded while positioned within or without the vat. When it is desired to wash the dishes, the lower rack 11 either loaded or unloaded will be placed within the vat and supported on its legs 48, and then the upper rack 10 likewise either loaded or unloaded will be placed within the vat so as to be supported upon the lower rack 11. If it be desired to load the lower rack while the racks are positioned within the vat, it is merely necessary to move the compartment 52 of the upper rack on its hinges to an open position, whereby access can be had to the interior of the vat. The attendant may then load the lower rack. While the compartment 52 is open, the attendant also probably will place the silver and like utensils in the compartment 44 provided for them. Then all these compartments 50, 51 and 52 of the upper rack may be loaded.

After the racks have been loaded, the cover 12a of the vat may be closed and the machine operated to wash the dishes.

As previously pointed out, plates and like dishes will be placed in the compartments 34 of the lower rack, while such utensils as soup plates, serving dishes, etc. will be positioned within the outer compartment 21 of the lower rack, so as to be supported by the ring member 36. Small flat dishes, such as saucers, etc. will be placed in the compartment 50 of the upper rack, while cups, small bowls, etc. will be arranged in the compartment 51 with their inner surfaces exposed to the interior of the vat. Relatively deep cups, bowls, bottles and the like are supported by the compartment 52.

The arrangement of the compartments 34 of the lower rack is quite important in that, as has been explained previously, water which is whirled upwardly and outwardly through the vat will impinge upon the sides of the dishes resting within these compartments with considerable force. The dishes are so supported in the compartment that they serve as baffles or deflecting vanes to direct the water in all directions through the upper rack 10, and hence, to effect a thorough cleansing action on the utensils placed within this rack. The dishes supported within the compartments 50, 51 and 52 of the upper rack and within the compartment 21 of the lower rack are exposed to the direct impact of the water.

In rinsing the dishes, it will be understood that the spray device 18 is used. Water issuing from the nozzles 18a is thrown upwardly and outwardly through the vat in streams and will cover all portions of the utensils located within the racks 10 and 11.

After the dishes have been washed, the cover 12a may be opened and the dishes allowed to remain in the racks until they are dry, or the racks may be removed to allow the dishes to dry. If the dishes are allowed to remain in the vat to dry, those in the upper rack 10 will first be removed, and then the compartment 52 will be opened so that those in the lower rack 11 can be removed. Of course, if desired both racks may be removed while loaded, the dishes thereafter being removed.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A tray for dishwashing apparatus comprising a plurality of closed wire members of substantially the same shape, but of different sizes arranged one within the other, and a plurality of brackets of substantially inverted U-shape spaced at intervals along said wire members arranged so that their legs span the space between said members to define between the brackets a plurality of spaced compartments for receiving relatively shallow flat plates and the like, one of the legs of each bracket being bent at each of a pair of points between its lower end and the upper bend of the U so that when a flat, shallow plate is inclined with its back against said bracket, the lower portion of said leg lies in a plane substantially parallel to the rim of the plate at its lower edge, and the upper portion of said leg adjacent the said upper bend of the U lies in a plane substantially parallel to the rim of said plate at the upper edge of said plate, and the other leg of each bracket having a bend adjacent its lower end so that the lower portion of the leg lies in a plane substantially parallel to the rim of said plate at its lower edge.

2. A tray for dishwashing apparatus comprising a pair of circular wire rings of different diameters arranged in substantially concentric relation, a plurality of wire brackets spaced at substantially uniform intervals circumferentially of said rings, each bracket having the shape of an inverted distorted U arranged to span the space between said rings so that said brackets define a plurality of circumferentially spaced compartments, means securing the lower ends of the legs of said brackets to said rings so as to support said brackets at an angle to the vertical in a predetermined direction with the points of attachment of the inner legs of said brackets with the inner ring positioned in advance of the points of attachment of the outer legs with the outer ring, said brackets being adapted to support relatively shallow plates and each being shaped to correspond with the shape of the bottom surface of said plates, the bottom portion of each of said legs inclining at a predetermined angle to the vertical in said predetermined direction, the upper end of the inclined portion of the outer leg terminating in a straight portion arranged at an angle to it, said straight portion in turn terminating in the bend of the U-shaped leg at a point in advance of the points of attachment of the legs of the bracket with said circular wire members, said bend connected to the bottom portion of the inner leg by two substantially straight portions, the straight portion adjacent the bend being arranged at an acute angle to said straight portion of the outer leg and said second straight portion of said inner leg being arranged at an acute angle to said first-named acute angle, and an open-work wire bottom wall for said compartments.

3. A tray for dishwashing apparatus comprising a pair of circular wire members of different diameters arranged in substantially concentric relation, a plurality of wire brackets spaced at intervals circumferentially of said rings, each bracket having substantially the shape of an inverted U spanning the space between said rings, means securing the ends of the legs of said brackets to the inner and outer rings so that said brackets are inclined to the vertical in a predetermined direction, a plurality of vertically spaced wire members of substantially rectangular shape larger than said ring members and a plurality of vertically arranged wire members connected to said square members to define an open-work wall, wire members securing said wall to said inner ring members so as to define a compartment surrounding the compartments defined by said brackets, wires defining handles at the corners of said square members secured to said square members, a third circular wire member of larger diameter than the diameter of the larger of said pair of circular wire members positioned in said compartment surrounding said brackets, extensions on said wire handles secured to and supporting said third circular wire member in an elevated position above the floor of said compartments, and an open-work screen covering the bottoms of all of said compartments.

4. A dish-supporting tray comprising a plurality of vertically spaced square-shaped marginal wire members, a circular member in a plane below the plane of the lower of said square members having a diameter less than the distance between the sides of said lower member, wire members securing said square and circular wire members to provide open-work outer and bottom walls, a second circular wire member having a diameter less than the diameter of said first circular wire member arranged substantially concentrically of said first member, a plurality of circumferentially spaced brackets having a substantially inverted U-shape with the legs connected to said circular members and extending upwardly therefrom so as to define circumferentially spaced chambers, a third circular wire member of larger diameter than said first circular wire member arranged substantially concentric to said first wire member around said brackets, and means supporting said third wire member in a plane elevated with reference to said bottom wall.

5. A dish-supporting tray for dishwashing apparatus and the like comprising a substantially U-shaped open-work compartment, a wire member opposite the base of said compartment, a second substantially square open-work compartment substantially within the plane of and embraced by the legs and base of said U-shaped compartment and covering substantially the entire area embraced by said legs and base, connecting means securing said second compartment to said base providing for relative movement between said two compartments so that said square compartment can be elevated from and returned to the plane of said U-shaped compartment and a stop mounted on said wire member for engaging said square compartment opposite said connecting means to hold it in said plane of said U-shaped compartment.

6. A dish-supporting tray for dishwashing apparatus comprising a plurality of substantially U-shaped open-work compartments, one of said compartments embracing the other compartment, a third open-work compartment embraced by the inner of said U-shaped compartments and hinge means pivotally connecting said third compartment with said inner U-shaped compartment.

7. A dish-supporting tray for dishwashing apparatus comprising a plurality of closed wire members of substantially the same size and shape arranged in vertically spaced relation with corresponding parts lying in common planes, a plurality of vertically spaced wire members of substantially the same size and shape but of smaller dimensions than said first named wire members embraced by said planes, and having corresponding parts lying in common planes, a plurality of wire members of approximately U shape, means securing one leg of each of said members to said first named wire members and the other leg to said second named wire members so as to define a relatively deep and narrow compartment, a plurality of vertically spaced wire members of substantially the same shape but progressively increasing in size from the top to the bottom member embraced by the planes of said second named wire members and arranged so that corresponding parts of said members define planes arranged at an angle to said planes of said second named members, a plurality of wire members of approximately U-shape and means securing one leg of each of said members to said last named wires and the other leg to said second named wires so as to define a second chamber embraced by said first chamber and having an inclined bottom wall.

8. A dish-supporting tray for dishwashing apparatus comprising a plurality of closed wire members of substantially the same size and shape arranged in vertically spaced relation with corresponding parts lying in common planes, a plurality of vertically spaced wire members of substantially the same size and shape but of smaller dimensions than said first named wire members embraced by said planes and having corresponding parts lying in common planes, a plurality of wire members of approximately U-shape, means securing one leg of each of said members to said first named wire members and the other leg to said second named wire members so as to define a relatively deep and narrow compartment, a plurality of vertically spaced wire members of substantially the same shape but progressively increasing in size from the top to the bottom member embraced by the planes of said second named wire members and arranged so that corresponding parts of said members define planes arranged at an angle to the planes of said second named members, a plurality of wire members of approximately U-shape, means securing one leg of each of said members to said last named wires and the other leg to said second named wires so as to define a second chamber embraced by said first chamber having an inclined bottom wall, wire members arranged to define a substantially rectangular open-work chamber of smaller dimensions than the said second named compartment and means pivotally connecting said last named compartent to said second named compartment.

9. A dish-supporting tray for washing apparatus comprising a plurality of vertically spaced substantially closed square wire members, a substantially U-shaped wire member having a similarly shaped reentrant portion embraced by said square members, wire members associated with said square and U-shaped members so as to define therewith a pair of U-shaped compartments, one embracing the other, wire members defining a third compartment separate from but embraced by said inner U-shaped compartment and means pivotally connecting said second and third compartments together.

10. A dish-supporting tray for washing apparatus comprising a plurality of vertically spaced substantially square closed wire members, a substantially U-shaped wire member having a similarly shaped reentrant portion embraced by said square members, wire members associated with said square and U-shaped members so as to define therewith a pair of U-shaped compartments, one embracing the other, and wire members defining a third compartment embraced by said inner U-shaped compartment.

11. A dish-supporting rack for dishwashing apparatus comprising an open-work compartment of substantially U-shape, a similarly shaped open-work compartment embraced by said first compartment and attached thereto, a third open-work compartment of rectangular shape separated from but embraced by said second compartment and means pivotally connecting said second and third named compartments together.

12. A dish-supporting tray for washing apparatus comprising wire members defining an open-work compartment having a bottom wall, a detergent container secured to said bottom wall provided with open upper and lower ends and a baffle arranged over the lower end of said container and spaced therefrom so as to provide a relatively narrow space between said members to provide for the discharge of detergent from said container.

13. A dish-supporting tray for washing apparatus comprising wire members defining an open-work compartment having a bottom wall, a detergent container secured to said bottom wall provided with open upper and lower ends, a baffle arranged over the lower end of said container and spaced therefrom so as to provide a relatively narrow space between said members to provide for the discharge of detergent from said container and wire members projecting upwardly from said bottom wall about said upper open end of said container so as to prevent utensils from being placed over said opening.

FORREST A. WALKER.

CERTIFICATE OF CORRECTION.

Patent No. 2,035,625.      March 31, 1936.

FORREST A. WALKER.

It is hereby certified that error appears in the printed specification of the above numbered patent requiring correction as follows: Page 2, first column, line 66, for ", the" read . The; page 3, second column, line 5, for "in" read is; page 7, first column, line 53, claim 4, after "circular" insert wire; and that the said Letters Patent should be read with these corrections therein that the same may conform to the record of the case in the Patent Office.

Signed and sealed this 5th day of May, A. D. 1936.

Leslie Frazer (Seal)      Acting Commissioner of Patents.

said second named members, a plurality of wire members of approximately U-shape, means securing one leg of each of said members to said last named wires and the other leg to said second named wires so as to define a second chamber embraced by said first chamber having an inclined bottom wall, wire members arranged to define a substantially rectangular open-work chamber of smaller dimensions than the said second named compartment and means pivotally connecting said last named compartent to said second named compartment.

9. A dish-supporting tray for washing apparatus comprising a plurality of vertically spaced substantially closed square wire members, a substantially U-shaped wire member having a similarly shaped reentrant portion embraced by said square members, wire members associated with said square and U-shaped members so as to define therewith a pair of U-shaped compartments, one embracing the other, wire members defining a third compartment separate from but embraced by said inner U-shaped compartment and means pivotally connecting said second and third compartments together.

10. A dish-supporting tray for washing apparatus comprising a plurality of vertically spaced substantially square closed wire members, a substantially U-shaped wire member having a similarly shaped reentrant portion embraced by said square members, wire members associated with said square and U-shaped members so as to define therewith a pair of U-shaped compartments, one embracing the other, and wire members defining a third compartment embraced by said inner U-shaped compartment.

11. A dish-supporting rack for dishwashing apparatus comprising an open-work compartment of substantially U-shape, a similarly shaped open-work compartment embraced by said first compartment and attached thereto, a third open-work compartment of rectangular shape separated from but embraced by said second compartment and means pivotally connecting said second and third named compartments together.

12. A dish-supporting tray for washing apparatus comprising wire members defining an open-work compartment having a bottom wall, a detergent container secured to said bottom wall provided with open upper and lower ends and a baffle arranged over the lower end of said container and spaced therefrom so as to provide a relatively narrow space between said members to provide for the discharge of detergent from said container.

13. A dish-supporting tray for washing apparatus comprising wire members defining an open-work compartment having a bottom wall, a detergent container secured to said bottom wall provided with open upper and lower ends, a baffle arranged over the lower end of said container and spaced therefrom so as to provide a relatively narrow space between said members to provide for the discharge of detergent from said container and wire members projecting upwardly from said bottom wall about said upper open end of said container so as to prevent utensils from being placed over said opening.

FORREST A. WALKER.

CERTIFICATE OF CORRECTION.

Patent No. 2,035,625.          March 31, 1936.

FORREST A. WALKER.

It is hereby certified that error appears in the printed specification of the above numbered patent requiring correction as follows: Page 2, first column, line 66, for ", the" read . The; page 3, second column, line 5, for "in" read is; page 7, first column, line 53, claim 4, after "circular" insert wire; and that the said Letters Patent should be read with these corrections therein that the same may conform to the record of the case in the Patent Office.

Signed and sealed this 5th day of May, A. D. 1936.

Leslie Frazer (Seal)                Acting Commissioner of Patents.

CERTIFICATE OF CORRECTION.

Patent No. 2,035,625.                                              March 31, 1936.

FORREST A. WALKER.

It is hereby certified that error appears in the printed specification of the above numbered patent requiring correction as follows: Page 2, first column, line 66, for ", the" read . The; page 3, second column, line 5, for "in" read is; page 7, first column, line 53, claim 4, after "circular" insert wire; and that the said Letters Patent should be read with these corrections therein that the same may conform to the record of the case in the Patent Office.

Signed and sealed this 5th day of May, A. D. 1936.

Leslie Frazer (Seal)                                              Acting Commissioner of Patents.